United States Patent [19]

Andrieu

[11] Patent Number: 5,290,644
[45] Date of Patent: Mar. 1, 1994

[54] ELECTROCHEMICAL SECONDARY CELL USING LITHIUM AND A LIQUID ORGANIC ELECTROLYTE

[75] Inventor: Xavier Andrieu, Bretigny sur Orge, France

[73] Assignee: Alcatel Alsthom Compagnie Generale d'Electricite, Paris, France

[21] Appl. No.: 858,871

[22] Filed: Mar. 27, 1992

[30] Foreign Application Priority Data

Mar. 29, 1991 [FR] France .................. 91 03877

[51] Int. Cl.$^5$ .............................................. H01M 2/16
[52] U.S. Cl. .................. 429/129; 429/197; 429/249; 429/254
[58] Field of Search ............... 429/248, 197, 249, 254, 429/216, 131, 133, 126, 137, 129

[56] References Cited

U.S. PATENT DOCUMENTS

| | | | |
|---|---|---|---|
| 4,675,258 | 6/1987 | McLoughlin et al. | 29/623.5 X |
| 4,812,375 | 3/1989 | Foster . | |
| 4,849,144 | 7/1989 | McLoughlin | 429/249 X |

FOREIGN PATENT DOCUMENTS 0332771  9/1989  European Pat. Off. .
0359524  3/1990  European Pat. Off. .

OTHER PUBLICATIONS

Patent Abstracts of Japan, vol. 13, No. 199 (C-594)(3547) May 11, 1989 & JP-A-1 020 257 (Mitsubishi) Jan. 24, 1989.

*Primary Examiner*—John S. Maples
*Attorney, Agent, or Firm*—Sughrue, Mion, Zinn, Macpeak & Seas

[57] ABSTRACT

An electrochemical secondary cell using lithium and a liquid organic electrolyte, the cell being of the cylindrical or prismatic type, wherein its separator comprises a microporous film of polyolefin next to the lithium anode and a film of cross-linked polymer that swells in the electrolyte and which applies pressure against the electrodes. The cross-linked polymer may be an ion conducting polymer including a polyether with two terminal amine functions.

10 Claims, No Drawings

ELECTROCHEMICAL SECONDARY CELL USING LITHIUM AND A LIQUID ORGANIC ELECTROLYTE

The present invention relates to an electrochemical secondary cell using lithium and a liquid organic electrolyte, the cell being of the cylindrical or prismatic type.

BACKGROUND OF THE INVENTION

The lifetime of such a cell is known to be limited by the low cycling yield of lithium and by the appearance of dendrites during recharging. In practice, it is necessary to use three to five times as much lithium as the quantity theoretically required. The main cause of failure in this type of cell comes from the dendrites which can give rise to internal short circuits. These short circuits give rise to localized heating which, in the presence of the finely-divided alkali metal and of the organic electrolyte can give rise to a battery explosion.

Proposals have already been made to use an optimized electrolyte composition (solvent, solute, additives) to improve the cyclability of the cell and to limit the effects of dendrite growth.

It is also known to replace pure lithium with alloys (such as LiAl, LiB, LiSi, . . .) for improving the reversibility of the negative electrode.

However, the above dispositions provide results that remain inadequate.

According to articles published in:
Powers 1990 Lithium Battery Report; and
Journal of Power Sources, 34 (1991), 31-38; it has been shown that increasing the pressure exerted on the anode makes it possible to obtain a significant increase in the lifetime of the cell. This pressure is provided by mechanical means on assembly. Thus, for a cylindrical cell having wound electrodes, the spiral winding is tight.

An object of the present invention is to provide compression means that are easier to implement than the previous mechanical means, and that are capable of accepting larger changes in size during operation of the cell.

SUMMARY OF THE INVENTION

The present invention provides an electrochemical secondary cell having a liquid organic electrolyte, the cell being of the prismatic or cylindrical type, including at least one lithium electrode, a microporous film of polyolefin, and a positive electrode with a predetermined interelectrode spacing, the cell including an additional separator situated adjacent to said positive electrode and constituted by a film of cross-linked polymer selected from cross-linked ion-conducting polymers and elastomers such as polybutadione, polyisoprene, and fluorine-containing elastomers, said cross-linked polymer being capable of swelling in said electrolyte so as to exert pressure on the electrodes.

The invention is particularly applicable to a cylindrical cell having spiral-wound electrodes.

In an advantageous embodiment, woven or non-woven organic or inorganic cloth is incorporated in said cross-linked polymer film to enhance swelling perpendicularly to the electrodes.

The said separator may also be disposed in the cell, outside the block formed by the electrodes for the purpose of providing a reserve of electrolyte, replacing the felts that are usually used.

Polymer swelling thus takes place in situ; it is sufficient to ensure good ion conductivity and electrode compression.

For example, the cross-linked ion conductor polymer capable of swelling may include a polyether having two terminal amine functions that are cross-linked by a curing compound including two epoxy functions.

Said polyether may be selected from a polyethylene oxide, a polypropylene oxide, or a statistical copolymer of the above two oxides alternated, sequenced, or grafted with polyethers. Its molecular mass may lie in the range 300 to 100,000.

The curing compound may be of the diglycidyl type, a polyepoxy resin, or a polyether having two terminal epoxy functions. The concentration of said curing compound is preferably selected so that the epoxy/amine ratio lies in the range 0.5 to 5.

The amine functions of the polyether react with the epoxy groups which open. The secondary amine functions formed may react in turn with the epoxy. This set of reactions ensures cross-linking and the formation of a three-dimensional lattice. The minimum size of the cross-linked lattice is fixed by the chain length of the polyether resin used.

The said cross-linked polymer capable of swelling may also include a non-reactive plasticizing agent compatible with polyether, having a high dielectric constant and a low vapor pressure. It may be a bipolar aprotic solvent (propylene carbonate, ethylene carbonate, g-butyrolactone, . . . ), a glyme (tetraglyme, hexaglyme, . . . ), or a glycol dimethylether (polyethyleneglycol dimethylether, . . . ). It may also be a mixture of several solvents. The cross-linked polymer may comprise up to 80% solvent.

Polyether cross-linking takes place in the presence of the plasticizing agent and it may be initiated thermally.

Other characteristics and advantages of the present invention appear from the following description of embodiments given by way of non-limiting illustration.

DETAILED DESCRIPTION

The following cross-linked polymers that are capable of swelling were prepared initially:

EXAMPLE 1

The following were dissolved in 10 $cm^3$ of acetonitrile at 25° C.:

0.5 grams (g) of polyoxyetheylene (5000) bis(amine) from Aldrich; and

10 $\mu l$ of diglycidylether ethylene glycol as a curing agent.

After being completely dissolved, the mixture was cast into a mold and the solvent was evaporated under a vacuum. The resulting film was cross-linked for four hours at 100° C. and was dried at the same temperature for 15 hours under a primary vacuum.

EXAMPLE 2

A polymer was made using the procedure of Example 1 and containing:

2 g of O,O'-bis-(2-aminopropyl)-polyethylene glycol 1900 sold under the trademark Jeffamine ED2001 by Texaco; and 1 g of polyepoxy resin sold under the trademark AW106 by Ciba Geigy.

EXAMPLE 3

An electrolyte was prepared using the procedure of Example 1, and containing:

1.5 g of O,O'-bis-(2-aminopropyl)-polyethylene glycol 1900 sold under the trademark Jeffamine ED2001 by Texaco; and 0.3 g of diglycidylether ethylene glycol as curing agent; and 2.6 g of propylene carbonate as non-reactive plasticizing agent.

A 200 μm thick film of each of the preceding examples was juxtaposed with a 50 μm thick film of microporous polypropylene of the Celgard 2500 type.

The assembly constituted a separator that was used in a cylindrical Li/$V_2O_5$ type rechargeable cell.

The negative electrode was a sheet of lithium and the positive electrode was a sheet of aluminum coated with $V_2O_5$ powder and with carbon black powder (comprising 10% by weight), conventionally bonded by a fluorine-containing polymer.

The film of microporous polypropylene was in contact with the lithium while the film of cross-linked polymer capable of swelling was in contact with the positive electrode.

The electrodes, the current collectors, and the separators were wound on a mandrel. The interelectrode space was predetermined and maintained by appropriate mechanical means. Once that operation had been completed, the assembly was soaked in a solution of equal quantities of propylene carbonate and dimethoxy ethane containing 1M lithium perchlorate. After the electrodes had been impregnated and the polymer had swollen, the storage cell was inserted in its cylindrical housing.

In a variant, the coiled assembly was inserted in its cylindrical housing and then impregnated with electrolyte.

In both cases the swelling of the polymer film exerted significant pressure on the electrodes.

The invention is naturally not limited to the embodiments described above. The cells of the invention may include the various types of anode, cathode, and liquid electrolyte that are commonly in use. The cells may be prismatic.

I claim:

1. An electrochemical secondary cell having a liquid organic electrolyte, the cell being of the prismatic or cylindrical type, including at least one lithium electrode, a microporous film of polyolefin, and a positive electrode, the cell including a film of cross-linked polymer situated adjacent to said positive electrode, said polymer film being molded and cross-linked before assembly of the cell components, said cross-linked polymer being selected from the group consisting of cross-linked ion-conducting polymers, and said cross-linked polymer being capable of swelling in said electrolyte so as to exert pressure on the at least one lithium electrode.

2. An electrochemical cell according to claim 1, wherein woven or non-woven organic or inorganic cloth is incorporated in said cross-linked polymer film.

3. A cell according to claim 1, wherein said cross-linked ion conducting polymer includes a polyether having two terminal amine functions cross-linked by a curing compound including two epoxy functions.

4. A cell according to claim 3, wherein said polyether is selected from a polyethylene oxide, a polypropylene oxide, or a statistical copolymer of the above two oxides alternated, sequenced, or grafted with polyethers.

5. A cell according to claim 4, wherein the molecular mass of said polyether lies in the range 300 to 100,000.

6. A cell according to claim 3, wherein the content of said curing compound is selected so that the epoxy-amine ratio lies in the range 0.5 to 5.

7. A cell according to claim 3, wherein said curing compound is of the diglycidyl type.

8. A cell according to claim 3, wherein said curing compound is a polyepoxy resin.

9. A cell according to claim 3, wherein said curing compound is a polyether having two terminal epoxy functions.

10. A cell according to claim 3, wherein said film of cross-linked polymer includes a non-reactive plasticizing agent selected from low vapor pressure bipolar aprotic solvents, glymes, glycol dimethyl ethers, and mixtures thereof.

* * * * *